United States Patent
Scribner

[11] 3,826,267
[45] July 30, 1974

[54] LEGUME HARVESTER WITH WIPED SIDE PANELS

[75] Inventor: Frank F. Scribner, Hoopeston, Ill.

[73] Assignee: FMC Corporation, San Jose, Calif.

[22] Filed: Feb. 7, 1973

[21] Appl. No.: 330,333

[52] U.S. Cl. ............................................. 130/30 H
[51] Int. Cl. .................................................... A01d
[58] Field of Search ......................... 130/30 H, 30 R

[56] References Cited
UNITED STATES PATENTS

| | | | |
|---|---|---|---|
| 2,048,345 | 7/1936 | Lott | 130/30 H |
| 2,543,537 | 2/1951 | Smith | 130/30 H |
| 2,865,378 | 12/1958 | Carmichael | 130/30 H |
| 2,910,070 | 10/1959 | Greedy et al. | 130/30 H |
| 3,087,499 | 4/1963 | Carmichael et al. | 130/30 H |
| 3,709,231 | 1/1973 | Looker et al. | 130/30 H |
| 2,768,628 | 10/1956 | Hermanson | 130/30 H |

Primary Examiner—Antonio F. Guida
Attorney, Agent, or Firm—C. E. Tripp

[57] ABSTRACT

A field harvester for legumes such as peas, beans or the like includes a rotating drum screen containing beaters with a forwardly running crop conveyor beneath the screen. A shroud surrounds the upper portion of the drum screen and has depending side panels for directing shelled crop downwardly to the crop conveyor. The depending side panels are curved to conform to the drum screen and the screen has an external wiper that dislodges crop from a first curved side panel and sweeps it down to the crop conveyor. The wiper sweeps crop up from the opposite curved side panel, carries it up and around to the first curved side panel, and sweeps it down to the crop conveyor. The lower, crop delivery edge of the first side panel runs diagonally above the crop conveyor.

6 Claims, 13 Drawing Figures

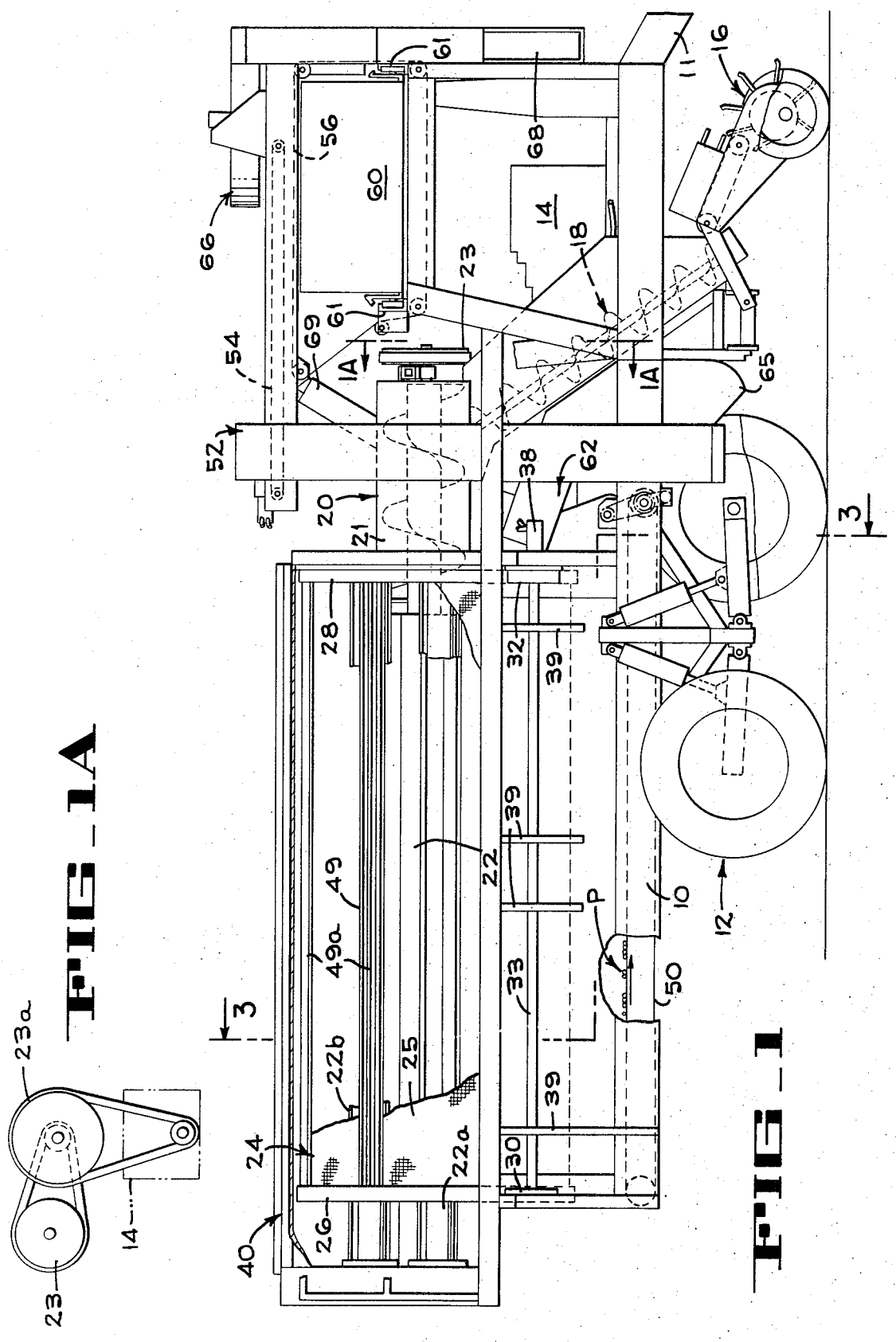

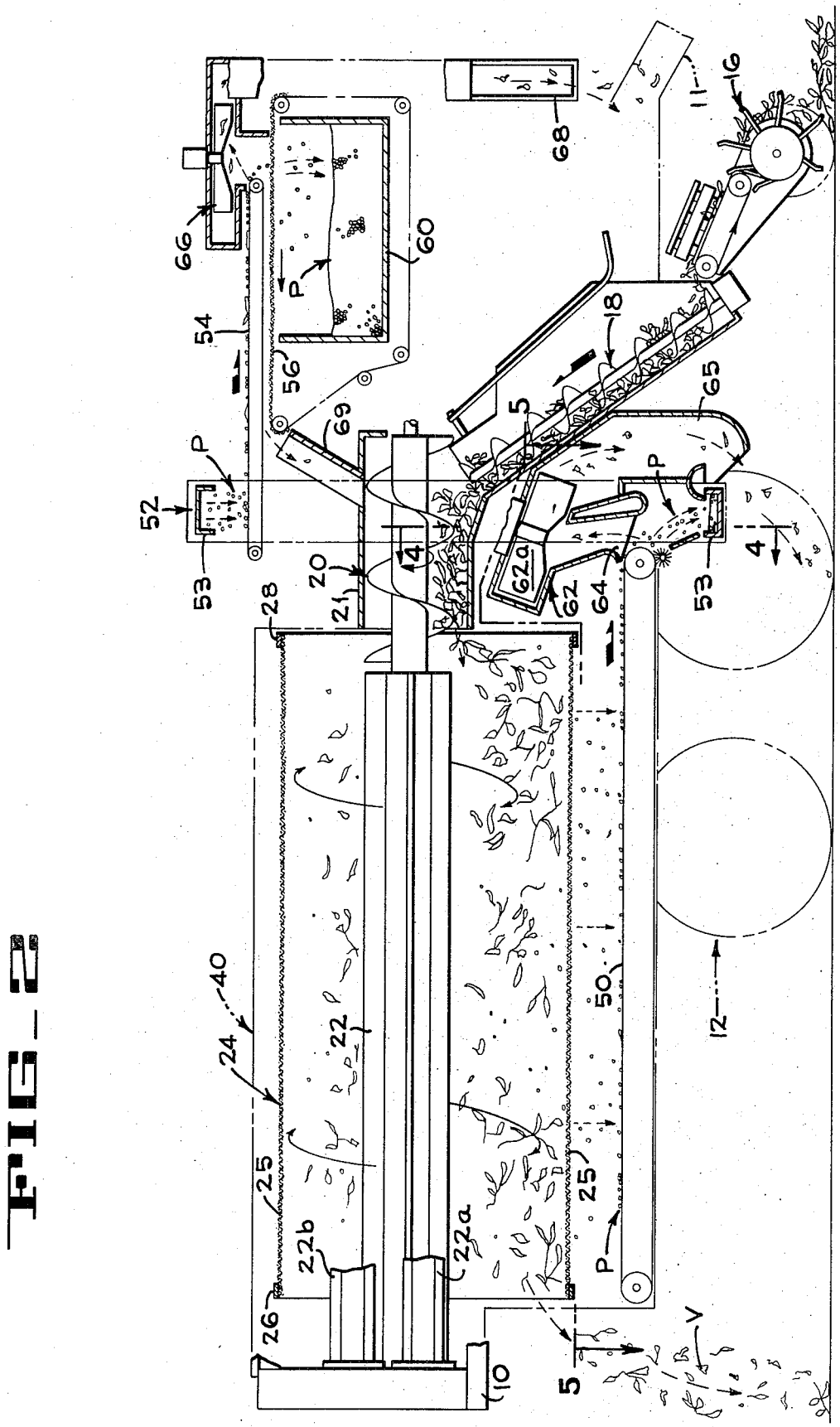

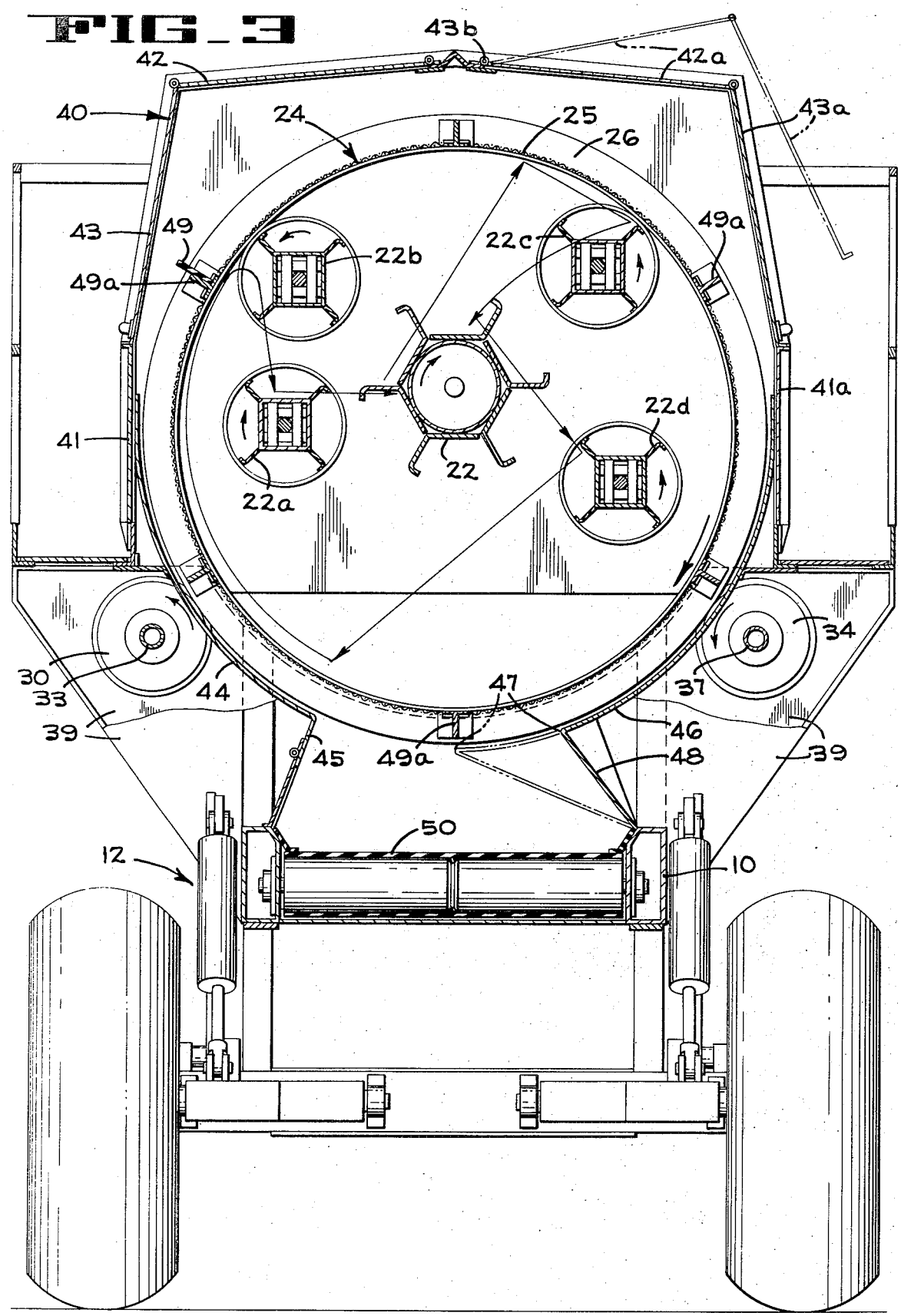

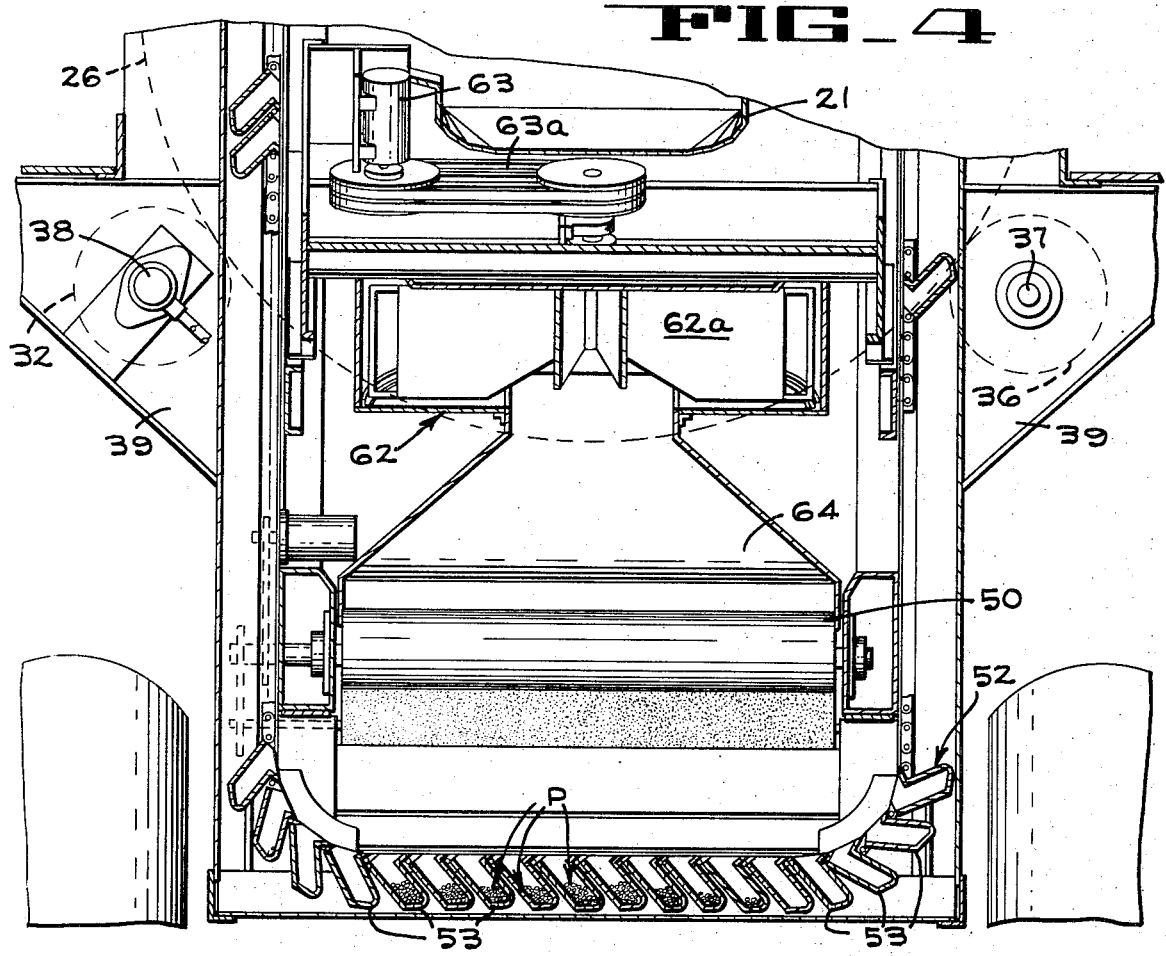
FIG_4
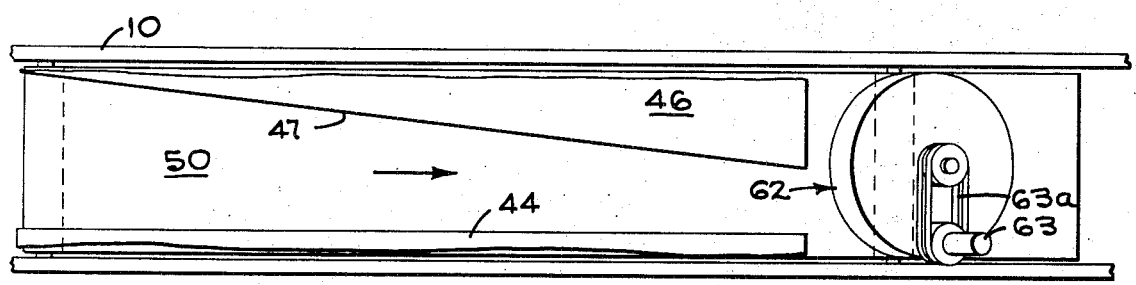
FIG_5
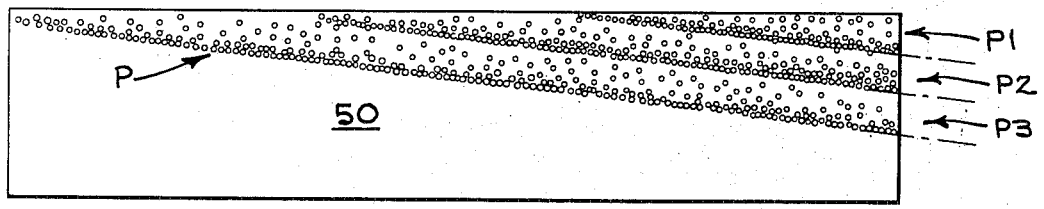
FIG_5A

LEGUME HARVESTER WITH WIPED SIDE PANELS

REFERENCE TO RELATED APPLICATIONS

This is an improvement in the combination oscillating and wiped side panel assembly that forms the subject matter of Looker et al., Ser. No. 272,617, filed July 17, 1972, now abandoned and assigned to the FMC Corporation.

A single wiped side panel construction forms the subject matter of Scribner, Ser. No. 330,341, filed Feb. 7, 1973, now abandoned, which is a division of Ser. No. 272,617.

The multiple beater threshing assembly forms the subject matter of the copending application of Looker et al., Serial No. 141,900, filed May 10, 1971, now U.S. Pat. No. 3,709,231, issued Jan. 9, 1973, assigned to the FMC Corporation.

The auger feed structure forms the subject matter of the copending application of Burenga, Ser. No. 274,019, filed July 12, 1972, now U.S. Pat. No. 3,769,988, issued Nov. 6, 1973 and assigned to the FMC Corporation.

The hopper structure forms the subject matter of the copending application of Scribner, Ser. No. 272,618 filed July 17, 1972, now U.S. Pat. No. 3,771,531, issued Nov. 13, 1973 also assigned to the FMC Corporation.

FIELD OF THE INVENTION

The present invention relates to agricultural harvesters and more particularly to field harvesters or combines for leguminous crops such as peas, beans or the like.

DESCRIPTION OF PRIOR ART

The harvester of the present invention adopts the general approach of delivering the shelled crop from a rotating drum screen to an underlying crop conveyor that is disclosed in the U.S. Pat. to Greedy et al. No. 2,910,070, Oct. 27, 1959. In this patent, the shroud that surrounds the drum screen has flat, depending side panels that are intended to deliver the shelled crop to the underlying, forwardly running crop conveyor. Experience in the field with harvesters of this type reveals that some of the shelled crop, which contains considerable moisture and may contain some crushed peas, beans or the like, adheres to the depending side panels. This results in mildew and spoilage of the adhering masses so that occasionally clumps of mildewed or spoiled crop will be collected along with the fresh crop. In order to minimize this undesirable effect, the side panels of the aforesaid Greedy et al patent must deliver crop to the crop conveyor at a relatively steep or large angle (almost 90°) and thus the crop conveyor must be almost as wide as the drum screen. This can interfere with optimum chassis design and requires an undesirably wide chassis and a wide wheel spacing. Even with a steep angle of inclination of the side panels, it has been found that crop can adhere thereto and hence the Greedy et al approach to shelled crop handling, although simple, has not been successfully adopted.

The shelled crop delivery problem has resulted in constructions that substitute one or two upwardly running aprons or draper belts beneath the drum screen, such as that of the U.S. Carmichael Jr. et al. Pat. No. 3,087,499, Apr. 30, 1963. This construction, wherein the crop drops through the drum screen onto one or more conveyor aprons and rolls back onto a relatively narrow longitudinally running crop conveyor, solves the physical design problem relating to crop conveyor width but is more complicated than the Greedy et al patent type construction. Furthermore the upper trash delivery ends of the aprons or draper belts project from the sides of the machines, increase its width and interfere with access to the drum screen along the sides of the machine for maintenance.

Similar patents which have adopted the aforesaid apron conveyor approach are those U.S. Pats. to Carmichael Jr. No. 2,865,378, Dec. 23, 1958 and Mather et al. No. 2,934,073, Apr. 26, 1960.

Another approach to the crop delivery problem is shown by U.S. Pat. to Schultz No. 3,415,371, Dec. 10, 1968, wherein a horizontally running draper belt below the drum screen delivers shelled crop to a single upwardly inclined apron at one side of the machine, the latter droping the crop onto a narrow, forwardly running crop conveyor. This construction is subject to the same objections as that of the spron conveyor patents just described. A similar approach is that of U.S. Pat. to Hamachek III et al. No. 3,263,025, Feb. 22, 1966 (FIG. 9), wherein a single, wide upwardly running apron is disposed beneath the drum screen, the lower end of which drops the crop onto a very narrow forwardly running crop conveyor. This design requires a fixed side panel opposed to the apron which can provide crop adherence difficulties despite the mechanical complexity and the excessive width of the Hamachek III et al. machine.

SUMMARY OF THE INVENTION

Insofar as the shelled crop handling system at the drum screen is concerned, this invention can best be characterized as an improvement over the aforesaid application of Looker et al. U.S. Pat. No. 272,617. In the aforesaid Looker et al. application, the crop adhesion problem is solved in a harvester of the side leveling type (see Carmichael Jr. et al. U.S. Pat. No. 3,033,584, May 8, 1962 for a suitable leveling construction), by modifying both depending side panels that direct shelled material from the drum screen to the underlying crop conveyor. One of the depending side panels of the shroud, namely the side panel at the upwardly turning side of the drum screen, is formed as a downwardly inclined hinged plate pivoted at its upper end and oscillated sideways by a rotating cam. The oscillation prevents initial adherence of individual particles of shelled crop so that moist or mashed crop rolls down to the underlying crop conveyor. The opposed side panel of the shroud, which is on the downwardly turning side of the drum screen, is curved to conform to the drum screen and a wiper on the drum screen sweeps across the curved panel and cleans it of any crop which would otherwise adhere. The curved panel has a reverse angled or recurved depending extension that confines the crop so that it will fall on the underlying crop conveyor, which panel is at such an angle that it presents no adherence problems.

Although the combination of the oscillating side panel on the upwardly turning side of the screen and the curved side panel on the ther side that is wiped clean has been found to be an effective solution to the crop adherence problems under most circumstances, experience has shown that in cases wherein the crop is unusually moist, due to weather and other conditions beyond control of the operator, some adherence problems are presented by the oscillating side panel portion of the crop delivery system. The present invention provides an improvement of operation under these "critical" or "difficult" conditions and substantially completely eliminates clumping, sustained crop adherence, mildew and the like which can occur in accordance with the previous explanations.

In accordance with the present invention, the curved side panel on the downwardly turning side of the drum screen and the wiper on the drum screen are retained and due to the positive action of the wiper on the curved side panel no crop adherence problems are presented along that side of the harvester. On the opposite side of the harvester, which is at the upwardly turning side of the drum screen, a curved side panel which closely conforms to the periphery of the drum screen is provided. It has been found that although this side panel is on the upwardly turning side of the drum screen, the panel can be positioned so that the same wiper that sweeps off the first side panel on its downwardly moving stroke can be employed to sweep up material that might adhere to the curved side panel on the upwardly turning side. It has also been found that this material will be carried up and around the screen by the wiper and brought back to the first curved side panel whereupon it is swept down and around that side panel (along with crop that has been deposited thereon in the meantime) and cause it to be delivered and dropped from the lowermost edge of the panel to the upper reach of the crop conveyor. Thus with this construction no crop adherence, mildew, clumping or the like can occur even under the most severe moisture conditions encountered during harvesting of these crops.

As previously explained, the curved side panel that is on the downwardly turning side of the drum screen and which is wiped or swept free and clean by the flexible wiper on the drum screen delivers crop directly to the upper reach of the crop conveyor. If the delivery or lower edge of this curved side panel is parallel or substantially parallel to the path of the crop conveyor, then the crop will be delivered to that conveyor in a longitudinal, multi-layer row. This results in a long clump or ridge of crop on the conveyor which is not as readily cleaned of trash or the like by the fan that is disposed at the delivery end of the conveyor, as is crop that is spread more uniformly across the width of the conveyor. This condition is aggravated by the fact that normally the drum screen makes more than one revolution (approximately three revolutions) during the time that the upper reach of the crop conveyor traverses the length of the drum screen. As a result of this speed differential, if the lower or delivery edge of the curved side panel on the downwardly side of the drum screen is parallel to the path of motion of the crop conveyor, then linear clumps of crop would overlap and hence be superposed, thereby aggravating the clumping problem and the trash cleaning problem by the fan just described.

It has been found that these problems are characteristic of a wiped curved side panel on the downwardly turning side and are substantially eliminated by making the delivery edge of that side panel oblique or diagonal to the path of motion of the conveyor and hence to the axis of the drum screen. With this diagonal side panel construction, crop delivered to the crop conveyor from the curved side panel by the action of the wiper on the drum screen is distributed laterally across the width of the crop conveyor and hence runs under the fan in a progressive manner. Even more important is that in the usual case, wherein the drum screen makes several revolutions while the crop conveyor moves under the drum screen by one length of the screen, the material swept down and off of the curved side panel is always deposited on a fresh surface of the crop conveyor instead of being piled upon a previously deposited linear ridge of the material. These conditions cooperate to alleviate the problems of severe clumping or massed rows of material on the crop conveyor as the material is subjected to the cleaning action of the fan.

DESCRIPTION OF THE DRAWINGS

FIG. 1 is a side view of a harvester embodying the invention and with parts broken away.

FIG. 1A is a diagramatic view looking in the direction of arrows 1A—1A of FIG. 1 showing the drive to the main beater.

FIG. 2 is a view like FIG. 1 but in vertical section with some of the parts shown diagramatically, others omitted.

FIG. 3 is an enlarged section taken on 3 — 3 of FIG. 1 showing the drum screen beaters and wiped side panels.

FIG. 4 is an enlarged fragmentary section taken along line 4 — 4 of FIG. 2 showing the fan.

FIG. 5 is a view looking in the direction of arrows 5 — 5 of FIG. 2 showing the diagonal disposition of one side panel.

FIG. 5A is a diagram showing crop distribution on the conveyor.

GENERAL DESCRIPTION

Figure 6:
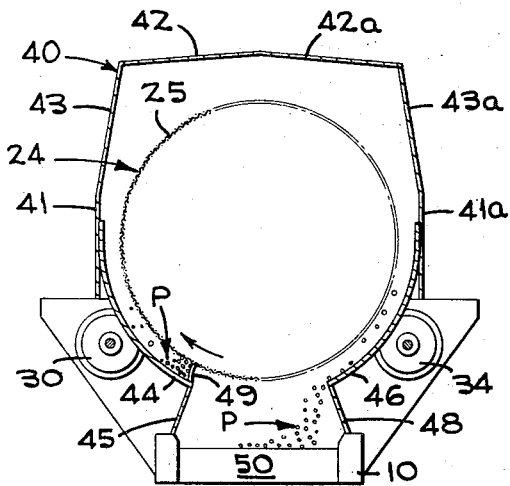
FIGS. 6 - 11 are simplified operational diagrams.

In the embodiment of the invention described, the harvester is of the type that is towed by a tractor or the like but the combine mechanism and the various conveyors are self-powered.

Since harvesters of this type are well known in the art, only those details of the frame and chassis structure essential to an understanding of the general nature of the machine will be explained. A more complete description of the drives and various conveying elements of the harvester disclosed herein appears in the aforesaid application of Looker et al. Ser. No. 272,617, and only those constructions essential to an understanding of the panel cleaning construction of the present invention will be described in detail herein.

Referring to FIG. 1, the harvester has a main frame indicated generally at 10, to which is connected a tow bar 11, shown incompletely. The present invention is equally applicable to a self propelled harvester. The frame is supported on two pairs of wheels that embody automatic leveling mechanisms such as that in the aforesaid U.S. Pat. to Carmichael Jr. et al. No. 3,033,584. This wheel and leveling structure is indicated generally at 12 in FIG. 1, and since the details thereof are not critical to the present invention they will not be described. The harvester mechanisms are powered by an internal combustion engine 14 for turning the drum screen and beaters. Various hydraulic motors are driven from a conventional pump unit (not shown) by the engine and the various hydraulic motors are mounted on the harvester above the towbar 11 and face forwardly for operation by the tractor driver. This feature is conventional in towed harvesters and since it is not critical to the invention is not illustrated.

The harvester includes a reel and conveyor crop pickup indicated generally at 16, which picks up cut vines that have been placed in windrows and directs the crop to a twin feed auger and housing elevating assembly indicated generally at 18 and described in detail in the aforesaid application of Burenga, Ser. No. 274,019.

The twin auger assembly 18 delivers the crop to a single infeed auger indicated generally at 20 disposed in a housing 21, which auger forms a forward extension of the shaft for the main beater 22 (FIGS. 2 and 3), as it is also described in detail in the Burenga application. As seen in FIGS. 1 and 1A, the shaft for auger 20 is driven by an auger pulley 23 and a countershaft pulley and belt assembly 23a driven from the engine 14.

A large, rotating drum screen indicated generally at 24 forms a major component of the threshing unit of the harvester. The screen 24 appears in FIG. 2 and in section in FIG. 3. As seen in FIG. 3, the main beater 22 is surrounded by satellite beaters 22a – 22d, in accordance with the aforesaid copendingg application of Looker et al., Ser. No. 141,900.

In accordance with conventional practice, the drum screen 24 includes a wire or cloth mesh screen proper 25, which may be formed as longitudinal panels secured between end rings 26, 28. The end rings are supported on rollers 30, 32 on a shaft 33 on one side (FIG. 1) and by corresponding rollers 34 (FIG. 3) and 36 (FIG. 4) on a shaft 37 on the other side. The roller shaft 33 is driven by a hydraulic motor 38 (FIGS. 1 and 4) to rotate the drum screen 24. The roller shaft 33 rotates in frame gussets 39 (FIG. 1) and the roller shaft 37 is similarly mounted on the other side of the harvester. Drum screens of this type are known in the art and the details thereof are not critical to the invention.

The drum screen 24 is surrounded by a shroud embodying the present invention. This shroud, as seen in FIG. 3, is indicated generally at 40 and includes lower vertical side panels 41,41a and hinged panel upper sections 42,43 and 42a,43a which do not conform to the drum screen periphery and which are hinged to the frame at 43b. The shroud 40 also includes a curved, depending side panel 44 (FIG. 3) on the upwardly turning side of the screen 25, which panel extends between the vertical side panel 41 and a downwardly directed, re-curved lowermost panel 45. On the downwardly turning side of the screen 24 is a depending curved side panel 46, extending between the vertical side panel 41a and connecting at a diagonal lip 47 to a re-curved lowermost panel 48. A flexible wiper 49 (FIG. 3) is mounted on the drum screen 25 for wiping crop from the curved panels 44,46. The mode of operation of this curved panel shroud construction will be described in detail after completion of a general description of the harvester.

As to the crop flow, and as seen in FIGS. 2 and 3, the crop is delivered to the interior of the drum screen 24 by the infeed auger 20 and drops into the meshed screen 25. This crop is threshed by beaters 22–22d (FIG. 3) inside the rotating screen and the vines V are ejected from the rear of the screen as shown in FIG. 2. The threshed crop P (e.g. peas or beans) falls through the screen 25 and reaches the curved side panels 44 and 46 (FIG. 3) eventually falling onto a forwardly running crop conveyor 50. Of course some crops drop directly onto the conveyor 50 but much of the threshed crop falls onto the curved side panels 44,46 either directly from the screen or from vertical sides of the shroud 40. The conveyor 50 delivers the threshed crop to the lower transverse reach of a forwardly disposed, endless bucket conveyor 52 that runs transversely around the harvester and has buckets 53 for the crop (FIG. 4). The upper transverse reach of the bucket conveyor 52 dumps the crop onto an upper, forwardly running delivery conveyor 54 (FIG. 2) driven in a manner described in detail in the aforesaid copending application of Scribner, Ser. No. 272,618. The delivery conveyor 54 delivers the crop to the upper, rearwardly running reach of a mesh type podder conveyor 56, the construction of which is known in the art, and the details of which are not critical to the present invention. The podder conveyor 56, which is also driven as described in the aforesaid Scribner application, screens out trash and pods but has a mesh with openings sufficient to drop the peas, beans or the like into a dump bucket or hopper 60 (FIG. 2) the construction of which forms the subject matter of the aforesaid copending application of Scribner. The hopper 60 can be shifted laterally on tracks 61 (FIG. 1) for dumping into a vehicle alongside the harvester.

In order to remove trash that works its way through the drum screen 24 and is picked up by the crop conveyor 50 along with the crop itself, two blowers or fans are provided. As seen in FIGS. 2 and 4, a lower or primary suction fan 62 is disposed at the delivery end of the crop conveyor 50. The rotor 62a of the fan 62 is driven by a hydraulic motor 63 (FIG. 4) and a belt and pulley assembly 63a. The fan 62 has an inlet mouth 64 disposed across the conveyor 50 which draws air up past the delivery end of the crop conveyor 50 and hence removes most of the trash, ejecting it through a discharge duct 65 to the ground (FIG. 2). Any trash that remains with the crop is carried up by the bucket conveyor 52 and onto the forwardly running delivery conveyor 54. As is also seen in FIG. 2, when the conveyor 54 drops the crop onto the podder conveyor 56, an upper or secondary suction fan 66 draws trash up and away from the delivery end of the conveyor 54 and blows it out a forward discharge duct 68. In case unthreshed or crop pods which are not light enough to be carried away by the trash blowers just described remain on the podder conveyor 56, these pods, etc. are delivered by the podder conveyor 56 back into the infeed auger assembly 20 by means of a chute 69 best seen in FIG. 2.

Having completed a general description of the harvester and the manner in which crop flows therethrough, the wiped panel construction of the present invention will now be described in more detail.

SIDE PANEL CONSTRUCTION AND OPERATION

As previously described, a pair of curved or arcuate side panels 44,46 conform rather closely to the periphery of the rotating drum screen assembly 24 and a flexible wiper 49 is mounted on the screen to clean off the curved panels, thus preventing adhesion of moist crop to the side walls of the machine with attendant spoilage, mildew, clumping, etc.

Referring to FIG. 3, the curved panel 44 at the upwardly turning side of the drum screen extends through an arc of something over 60 degrees between the recurved, depending side panel 45 and the vertical wall 41 of the shroud 40. The other curved side panel 46 is of the same construction but due to the fact that its delivery edge or lip 47 is disposed diagonally relative to the motion of the crop conveyor 50, this panel encompasses an angle ranging between something over 60 degrees to about 90 degrees. This diagonal construction of the delivery lip 47 distributes the crop laterally along the conveyor 50, as previously mentioned.

The wiper 49 is formed of rubberized fabric and is bolted or otherwise secured to one of the longitudinal ribs 49a (FIG. 3) that define the panels for mounting the mesh screen 25 in the drum screen assembly. The wiper 49 has a radial extent sufficient to cause it to engage the curved panels 44,46 in a manner which deflects the wiper comewhat for insuring reasonably firm wiping engagement with the curved panels.

The drum screen assembly 24 will make more than one revolution during the period of time required for the conveyor 50 to traverse a distance equal to the longitudinal dimension of the drum screen. Although the relative rates of revolution of the drum screen to the linear speed of the conveyor 50 might vary, depending upon the crop being harvested and the crop conditions, generally speaking, the drum screen will make about three revolutions for each traverse of the crop conveyor 50.

The diagram of FIG. 5 shows how the crop delivery edge or lip 47 of the curved side panel 46 on the downwardly turning side of the drum screen is disposed diagonally or obliquely to the direction of the motion of the crop conveyor 50. Actually, this panel extends from a position close to the edge of the conveyor at its rear end to a position close to the midplane of the conveyor adjacent the fan 62. As a result of the inclination of the lip or edge 47, and as illustrated in the diagram of FIG. 5A, the rows of threshed crop P, indicated as P1, P2 and P3, do not overlap but are in diagonally disposed relation. This minimizes the depth of the rows, spreads them laterally and expedites cleaning of the crop by the fan 62 adjacent the delivery end of the conveyor 50.

FIGS. 8 – 11 are diagrams illustrating successive stages during substantially one revolution of the drum screen assembly 24. In these diagrams a single wiper 49 is mounted on the drum screen.

In FIG. 6 the wiper 49 has been brought into initial engagement with the curved side panel 44 on the upwardly turning side of the screen, and has begun to wipe up any crop P that has been deposited upon or adhered to the side panel 44.

Figure 7:
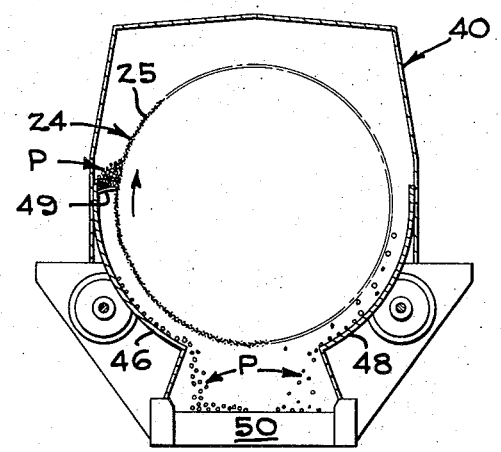

In FIG. 7 the wiper 49 has completed the wiping up of crop adhering to the side panel 44 and is beginning to carry the crop thus wiped up from the panel 44 up and around with the screen.

Figure 8:
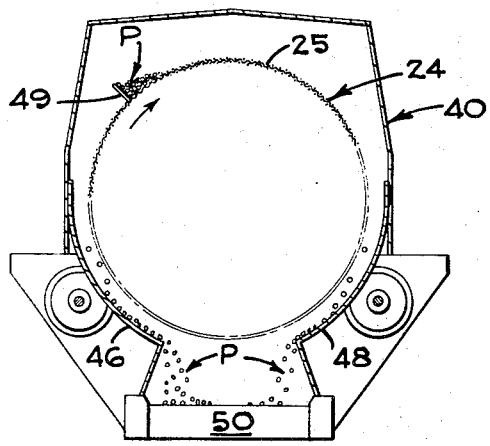

In FIG. 8 the wiper 49 is no longer engaged with the curved side panel 44 but is transporting crop that was wiped up from the panel 44 around the screen.

Figure 9:
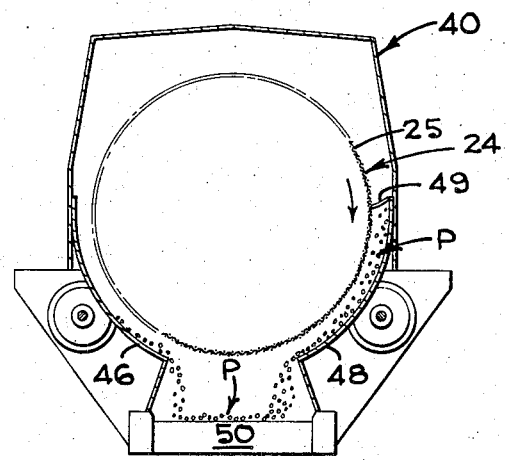

In FIG. 9 the wiper 49 has come into engagement with the side panel 46 on the downwardly turning side of the screen and hence will have deposited crop previously picked up from the panel 44 along the panel 46.

Figure 10:
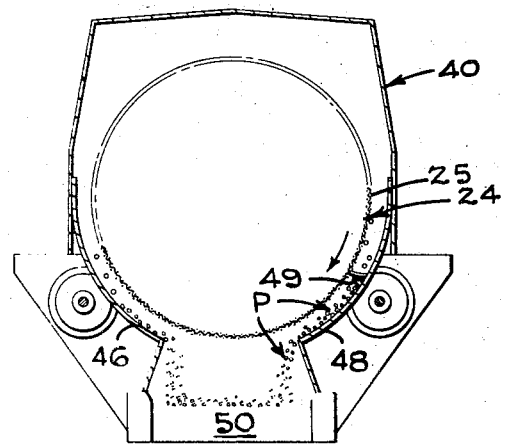

FIG. 10 shows the wiper 49 in the process of cleaning the side panel 46 on the downwardly turning side of the screen of crop deposited on and adhering to that panel.

Figure 11:
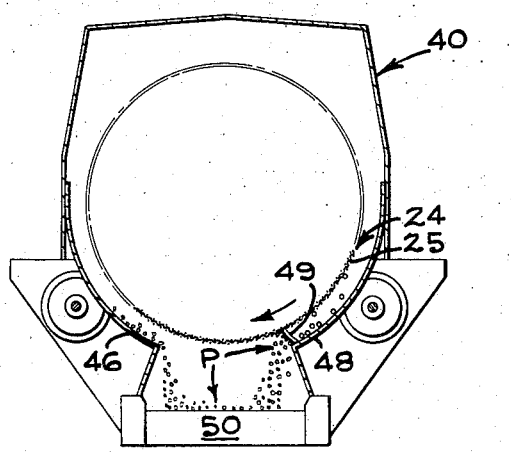

In FIG. 11, the wiper 49 is about to clear the side panel 46 and is depositing crop onto the conveyor 50.

Thus, with the dual curved side panel construction and the drum screen wiper of the present invention the problems of crop adherence, clumping, mildew, etc., which are aggravated under moist crop conditions, are substantially alleviated. Because of the diagonal disposition of the delivery edge or lip 47 of the side panel 46 on the downwardly turning side of the screen, the material delivered by the wiper 49 to the conveyor 50 is staggered along the width of the conveyor instead of being delivered thereon in the form of superposed rows of crop. This facilitates cleaning of the crop by the main fan or blower 62.

Although a single wiper 49 will ordinarily be adequate for the purposes described, it is obvious that a similar wiper could be installed diametrically opposite the wiper illustrated in the preferred embodiment of the invention. The mode of operation of this construction would be substantially identical to that just described in detail.

Although the best mode contemplated for carrying out the present invention has been herein shown and described, it will be apparent that modification and variation may be made without departing from what is regarded to be the subject matter of the invention.

What I claim is:

1. In a legume harvester of the type having a chassis, a rotating drum screen on said chassis, beater means in said screen, a longitudinally running crop conveyor beneath said drum screen, a shroud surrounding the upper portion of said drum screen and having depending side panels for directing shelled crop downwardly to said conveyor, and means for feeding vines and crop to the interior of said drum screen; the improvement wherein both of said side panels are curved to conform to the drum screen, and wiper means on said drum screen and engaging said curved side panels for dislodging material adhering to the side panel on the upwardly turning side of the screen and carrying the material around to the side panel on the downwardly turning side of the screen.

2. The harvester of claim 1, wherein the lower, delivery edge of the one side panel on the downwardly turning side is disposed diagonally above said crop conveyor for dropping material onto different lateral zones of the conveyor along its upper reach.

3. The harvester of claim 2, wherein the delivery edge of the side panel on the downwardly turning side extends diagonally from a zone near the associated side of the crop conveyor at the upstream end of the conveyor to a zone near the midplane of the conveyor adjacent the delivery end of the conveyor.

4. The harvester of claim 3, wherein the upper reach of said crop conveyor runs forwardly, and a trash removal fan is disposed above the delivery end of the conveyor.

5. The harvester of claim 1, wherein said curved side panels stop short of said crop conveyor and a continuation panel extends down from each curved panel toward the conveyor.

6. The apparatus of claim 5, wherein said continuation panels form an acute angle with the conveying surface of said conveyor.

* * * * *